United States Patent [19]

Bissing et al.

[11] 3,758,569

[45] Sept. 11, 1973

[54] PREPARATION OF MONOHALOACETYL HALIDES

[75] Inventors: Donald E. Bissing; Virgil W. Gash, both of Ballwin, Mo.

[73] Assignee: Monsanto Company, St. Louis, Mo.

[22] Filed: Aug. 4, 1972

[21] Appl. No.: 277,960

Related U.S. Application Data

[63] Continuation-in-part of Ser. No. 185,449, Sept. 30, 1971, abandoned.

[52] U.S. Cl............................ 260/544 Y, 260/544 M
[51] Int. Cl... C07c 51/58, C07c 53/14, C07c 63/10

[58] Field of Search................................. 260/544 Y

[56] References Cited
UNITED STATES PATENTS
2,862,964   12/1958   Lacey............................ 260/544 Y

*Primary Examiner*—Lorraine A. Weinberger
*Assistant Examiner*—Richard D. Kelly
*Attorney*—Neal E. Willis, John L. Young et al.

[57] ABSTRACT

A process for the preparation of monohaloacyl halides by halogenating ketenes in the presence of a lactone.

18 Claims, No Drawings

PREPARATION OF MONOHALOACETYL HALIDES

This application is a continuation-in-part of copending application Ser. No. 185,449 filed Sept. 30, 1971, now abandoned.

This invention relates to the preparation of monohaloacyl halides by the liquid phase halogenation of ketenes. More particularly, this invention relates to the halogenation of ketenes in the presence of a solvent or a reaction medium that inhibits or prevents the formation of polyhaloacyl halides and minimizes the formation of acyl halides. The term "halogen" as used herein includes chlorine, bromine, iodine and halogen halides such as iodine monochloride, iodine monobromide, bromine monochloride and the like.

The liquid phase halogenation of ketene is well known but the previously known methods of conducting this reaction have resulted in the formation of monohaloacyl halides contaminated with a considerable proportion of dihaloacetyl halides and polyhalogenated by-products. These earlier methods utilized such solvents as chlorinated benzenes, nitrobenzene, carbon tetrachloride, chloroacetyl chloride, acetyl chloride, 1,2-dichloroethane, acetonitrile, benzonitrile, nitromethane and various other solvents. Each of these solvents had a common shortcoming; that is, they all resulted in the formation of a considerable amount of dihaloacetyl halide, together with the desired product, monohaloacetyl halide. In some of these solvents, the undesired trihaloacetyl halides were also formed. The dihalo derivatives have no commercial utility and their separation from the monohalo derivative is expensive and time consuming. For example, dichloroacetyl chloride has a boiling point of approximately 107°C whereas monochloroacetyl chloride has a boiling point of about 105°C. This proximity of the boiling points of these two compounds renders their separation exceedingly difficult and also adds an expensive and uneconomical step to the halogenation process when utilized in the previously known solvents.

The monohaloacetyl halides produced by the process of this invention are valuable intermediates in the production of herbicidal alpha-haloacetanilides and other products. By contrast, the corresponding di-and trihaloacetyl halides have no commercial significance. In other words, they are present merely as diluents which detract from the efficacy of the commercially valuable monohaloacetyl halides. The severity of the problem is evidenced by the fact that all commercially available chloroacetyl chloride is contaminated with appreciable amounts of dichloroacetyl chloride, and in some instances the dichloroacetyl chloride content is as great as 6 percent.

In accordance with the present invention, the disadvantages of the prior art solvents are overcome by the halogenation of a ketene in the presence of a lactone of the formula

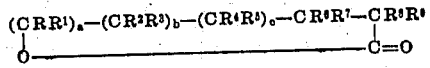

wherein R, R¹, R², R³, R⁴, R⁵, R⁶, R⁷, R⁸ and R⁹ are independently hydrogen, halogen, alkyl having a maximum of six carbon atoms, phenyl, alkylphenyl in which the alkyl group has a maximum of six carbon atoms, benzyl or alkyl benzyl in which the alkyl group has a maximum of six carbon atoms, and $a$, $b$ and $c$ are integers of 0 or 1.

The process of the present invention encompasses the halogenation of ketene, i.e. $CH_2=C=O$, as well as substituted ketenes, such as methyl ketene, dimethyl ketene, ethyl ketene, diethyl ketene, phenyl ketene, diphenyl ketene and the like.

Gamma-lactones, as well as beta-, delta- and epsilon-lactones can be used alone or in any combination for the purposes of the present invention. Suitable lactones include, for example, beta-propiolactone, delta- and gamma-valerolactones, gamma-butyrolactone, epsilon-caprolactones and the like. The lactones under consideration can be substituted or unsubstituted. Suitable substituents include methyl, ethyl, propyl, butyl, pentyl, hexyl, phenyl, tolyl, xylyl, benzyl, methylbenzyl, chloro, bromo and iodo. When an unsaturated lactone is introduced into the system, the unsaturation is satisfied by the addition of the halogenating agent to two adjacent carbon atoms originally joined by the double bond.

In carrying out the process of the present invention, the ketene and the halogen are introduced into the solvent medium of lactone where they react to form monohaloacyl halides which are separated from the reaction medium by conventional means such as distillation, preferably at reduced pressure. The process is amenable to either continuous or to batch type operation. The operating conditions under which the reaction is conducted are not critical but it is preferred to maintain them within specified limits to maximize the yield of the monohaloacyl halides. In essence, it is only necessary that the lactones are liquid under reaction conditions, Because of practical considerations, however, the reaction is normally conducted within the approximate temperature range of −50°C to 150°C at a pressure from about 50 mm. Hg. to about 2 atmospheres. In most instances, however, it is preferred to operate at a temperature between about 0°C and about 110°C at a pressure between about 100 mm. and about 760 mm. The reaction of the halogen and the ketene will progress to form substantially pure monohaloacyl halides regardless of the mole ratio of the reactants. The advantages of the present invention are more fully realized, however, when the mole ratio of halogen to ketene is maintained between about 0.8:1 and about 2.0:1 and optimum results are obtained with mole ratios of halogen to ketene between about 1:1 and about 1.3:1. The presence of a lactone of the present invention in the reaction medium minimizes the formation of acyl halides and substantially eliminates the formation of dihaloacyl halides and other polyhalogenated by-products.

In accordance with the present invention, the lactone can constitute substantially all or only a minor portion of the reaction medium. The benefits of the present invention are most pronounced when the solvent weight ratio is high but substantial benefits are realized even when the lactone is present in relatively small amounts. The undesirable polyhalogenated acyl halides are formed only in minute amounts even when the reaction medium contains a low ratio of lactone solvent and they are substantially excluded at the higher ratios. The weight ratio of the lactone to the sum of the lactone and the product, i.e., the solvent weight ratio, can vary from about 0.05:1 to about 0.99:1. In fact, during the normal course of a batch reaction, the solvent weight ratio diminishes with the formation of the product which becomes mixed with the lactone forming the reaction medium. In the practice of the continuous process, the solvent weight ratio can be maintained constant or varied to desired levels.

The invention will be more clearly understood from the following detailed description of specific examples thereof. In the examples and throughout the specification all proportions are expressed in parts by weight unless otherwise indicated.

EXAMPLE 1

About 191 parts (SOLVENT AMOUNT) of gamma-butyrolactone (SOLVENT) were charged into a suitable reaction vessel provided with agitation means, a gas outlet, temperature recording means and two gas spargers below the level of the lactone. With continuous agitation at atmospheric pressure (PRESSURE) and with the reaction medium maintained at a temperature of approximately 24°C (TEMPERATURE), ketene (KETENE) and chlorine (HALOGEN) were introduced through separate sparger at constant and substantially equimolar rates. After about 3 hours, the addition of the reactants was terminated. About 152 parts (HALOGEN AMOUNT) chlorine and about 82 parts (KETENE AMOUNT) ketene had been added during the course of the reaction. At the termination of the reaction, the ratio of the solvent to the sum of the solvent and product was about 0.45. The reaction mixture contained essentially only gamma-butyrolactone, chloroacetyl chloride (HALOACYL CHLORIDE) and acetyl chloride. The reaction mixture was completely devoid of dichloroacetyl chloride (DIHALOACYL HALIDE) and other polychlorinated by-products. Upon distillation to separate the pure chloroacetyl chloride, the mole percent yield of chloroacetyl chloride was determined to be 96 percent, together with about 4 percent acetyl chloride.

Although in this example the reaction mass was agitated, agitation is not necessary in the halogenation process of this invention. When bromine is the halogen, it is preferred to agitate the reaction mass but good results are also obtained without agitation.

Following the general procedure of Example 1 but with conditions and materials changed as noted in Table I the indicated products are obtained. The line titles of Table I are shown in parenthesis in the description of Example 1 where appropriate.

In Examples 3 through 5 the yield of haloacyl halide is high, i.e., above 90 percent, and the amount of dihaloacyl halide is minimized giving a haloacyl halide purity of greater than 98 percent. In Example 2 the yield of iodoacetyl chloride is about 80–90 percent. Diiodoacetyl chloride is extremely unstable and therefore is not found in the reaction mass of Example 2.

TABLE I

| Example No. | 2 | 3 | 4 | 5 |
|---|---|---|---|---|
| Solvent | Gamma-butyrolactone | Alpha-butyl-gamma-butyrolactone | Beta-chloro-gamma-butyrolactone | Beta phenyl-gamma-butyrolactone |
| Pressure (mm. Hg) | 100 | 100 | 760 | 760 |
| Temperature (°C.) | 5–10 | 20 | 30 | 50 |
| Ketene | Ketene | Ketene | Methyl ketene | Phenyl ketene |
| Halogen | Iodine monochloride | Chlorine | Chlorine | Chlorine |
| Solvent Amount (parts) | 200 | 100 | 150 | 32 |
| Halogen Amount (parts) | 179 | 85 | 148 | 22 |
| Ketene Amount (parts) | 42 | 48 | 100 | 36 |
| Haloacyl Halide | Iodoacetyl chloride | Chloroacetyl chloride | Alpha-chloro-propionyl chloride | Alpha-chloro-phenyl-acetyl chloride |
| Dihaloacyl Halide | | Dichloroacetyl chloride | Alpha, alpha-dichloro-propionyl chloride | Alpha, alpha-dichloro-phenyl-acetyl chloride |

Beta-(para-tolyl)-gamma-butyrolactone may be substituted for beta-phenyl-gamma-butyrolactone as the solvent in Example 5 to give similar results.

EXAMPLE 6

To a reactor fitted with spargers and thermometer was added 225 parts of beta-propiolactone. Chlorine and ketene were sparged into the reactor at 100 mm. of Hg pressure with the temperature maintained at about 20° to 25°C for approximately 2.5 hours. The chlorine introduced into the reactor during this time was sufficient to maintain a slight excess with respect to the ketene. Analysis of the nearly colorless product gave a purity of chloroacetyl chloride of higher than 98 percent. The yield of by-product acetyl chloride was about 2 percent.

EXAMPLE 7

Following substantially the same procedure as in Example 6 except that the solvent was 145 parts of gamma-valerolactone and the reaction time was about 134 minutes, the following results were obtained:

| | |
|---|---|
| Yield of chloroacetyl chloride (%) | greater than 90 |
| Purity (percent) | 99.7 |
| Yield of acetyl chloride (percent) | 9 |
| Yield of dichloroacetyl chloride (%) | 0.22 |
| Solvent recovered (percent) | 98 |

EXAMPLE 8

Following substantially the same procedure as in Example 6 except that the solvent was 173 parts of epsilon-caprolactone, the initial temperature was 8°C which was allowed to rise to about 20° to 25°C and the reaction time was about 140 minutes, the following results were obtained:

| | |
|---|---|
| Yield of chloroacetyl chloride (%) | 96 |
| Purity (percent) | 99.9 |
| Yield of acetyl chloride (percent) | 3.8 |
| Yield of dichloroacetyl chloride (%) | 0.12 |
| Solvent recovered (percent) | greater than 90 |

EXAMPLE 9

To a reactor fitted with a sparger, thermometer, dip tube and agitation means was added 106 parts of gamma-butyrolactone. A solution consisting of 175 parts of gamma-butyrolactone and 319.6 parts of bromine was placed in an addition funnel connected to the dip tube by means of a metering valve. The bromine solution was added to the reactor over a period of about 2 hours while ketene was simultaneously sparged into the reactor maintaned at 100 mm. of Hg pressure and a temperature of 20° to 25°C. The rate of bromine solution addition was adjusted so as to maintain an excess of bromine in the reactor. After the addition of the bromine solution was completed, ketene addition was continued until the bromine color disappeared from the solution. Based upon analysis of the final product, the bromoacetyl bromide yield was found to be at least 83 percent with a purity of 99.6 percent.

In order to illustrate the advantages of the solvents of the present invention, the procedure of the foregoing Example 1 was substantially duplicated using other solvents. The percent yields thus obtained, together with the results of representative examples of this invention are tabulated below in Table II.

TABLE II

| Solvent | Chloroacetyl Chloride Yield | Chloroacetyl Chloride Purity (%) | Acetyl Chloride Yield | Dichloro-Acetyl Chloride Yield | Solvent Recovered (%) |
|---|---|---|---|---|---|
| Example 1 | 96 | 100 | 4 | 0 | 92 |
| Example 7 | >90 | 99.7 | 9 | 0.22 | 98 |
| Example 8 | 96 | 99.9 | 3.8 | 0.12 | >90 |
| Ethyl Acetate | 92 | 96 | 5 | 3 | 78 |
| Carbon Tetrachloride | 42 | 69 | 43 | 15 | 75 |
| 1,2-Dichloroethylene | 35 | 53 | 41 | 24 | 90 |
| Methyl Acetate | 91 | 94 | 4 | 4 | 88 |
| Acetonitrile | 46 | 83 | 47 | 7 | 66 |
| Nitromethane | 48 | 74 | 39 | 13 | 75 |
| n-Butyl Acetate | 82 | 95 | 15 | 3 | 84 |
| n-Hexyl Acetate | 81 | 95 | 15 | 4 | 83 |
| Benzonitrile | 87 | 94 | 9 | 4 | 92 |

By comparison of the same procedure utilizing other solvents, it is self-evident that the solvents of the present invention substantially suppress the formation of polychloroacetyl chlorides and minimize the formation of acetyl chloride. The separation of pure chloroacetyl chloride from acetyl chloride and the solvent by fractionation presents no problem because of the wide divergence in boiling points of these compounds.

The improvement effected by the lactone solvents is also evidenced in the better than 90 percent recovery of the solvent for recycle purposes. This provides greatly improved economy of operation. It is also evident from the high percent recovery of the lactone solvents that the beneficial effect exerted by these solvents is due to the intrinsic nature of the chemical structure.

The beneficial results of the present invention are obtained in like manner with other lactones under consideration as well as with the other aforementioned halogenating agents. Bromine can be introduced into the system as the liquid, combined with the lactone in solution, or in the gaseous state below the surface of the reaction mass. In most instances it is preferred to conduct brominations in accordance with this invention by using a solution of bromine in the lactone solvent. When iodine monochloride is used as the halogenating agent, it can be charged into the reactor by dissolving it in the lactone solvent and then adding the resulting solution to the system.

Although the invention has been described with respect to specific modifications, the details thereof are not to be construed as limitations except to the extent indicated in the following claims.

What is claimed is:

1. A process for the preparation of a monohaloacyl halide which comprises reacting a ketene and a halogen selected from the group consisting of chlorine, bromine, iodine, iodine monochloride, iodine monobromide and bromine monochloride in the presence of a lactone of the formula $$(CRR^1)_a-(CR^2R^3)_b-(CR^4R^5)_c-CR^6R^7-CR^8R^9$$
$$|\phantom{(CRR^1)_a-(CR^2R^3)_b-(CR^4R^5)_c-CR^6R^7-C}|$$
$$O\text{———————————}C=O$$

wherein R, $R^1$, $R^2$, $R^3$, $R^4$, $R^5$, $R^6$, $R^7$, $R^8$ and $R^9$ are independently hydrogen, halogen, alkyl having a maximum of six carbon atoms, phenyl, alkylphenyl in which the alkyl group has a maximum of six carbon atoms, benzyl or alkyl benzyl in which the alkyl group has a maximum of six carbon atoms, and $a$, $b$ and $c$ are integers of 0 or 1.

2. A process in accordance with claim 1 wherein $a$, $b$ and $c$ are 1.

3. A process in accordance with claim 1 wherein $a$ and $b$ are 1, and $c$ is 0.

4. A process in accordance with claim 1 wherein $a$ is 1, and $b$ and $c$ are 0.

5. A process in accordance with claim 1 wherein $a$, $b$ and $c$ are 0.

6. A process in accordance with claim 1 wherein R, $R^1$, $R^2$, $R^3$, $R^4$, $R^5$, $R^6$, $R^7$, $R^8$ and $R^9$ are hydrogen.

7. A process in accordance with claim 1 wherein the lactone is gamma-butyrolactone.

8. A process in accordance with claim 1 wherein the lactone is gamma-butyrolactone and halogen is chlorine.

9. A process in accordance with claim 1 wherein the lactone is gamma-butyrolactone and the halogen is bromine.

10. A process of claim 1 wherein the lactone is beta-propiolactone.

11. A process of claim 1 wherein the lactone is gamma-valerolactone.

12. The process of claim 1 wherein the lactone is epsilon-caprolactone.

13. The process of claim 1 wherein the lactone is alpha-butyl-gamma-butyrolactone.

14. The process of claim 1 wherein the lactone is beta-chloro-gamma-butyrolactone.

15. The process of claim 1 wherein the lactone is beta-phenyl-gamma-butyrolactone.

16. The process of claim 1 wherein the lactone is beta-(para-tolyl)-gamma-butyrolactone.

17. A process of claim 1 wherein the ketene is unsubstituted ketene.

18. A process of claim 17 wherein the halogen is chlorine.

* * * * *